United States Patent [19]

Pfriender

[11] Patent Number: 4,520,758
[45] Date of Patent: Jun. 4, 1985

[54] ANIMAL HOUSE

[76] Inventor: John A. Pfriender, 3 Steuben Dr., Jericho, N.Y. 11753

[21] Appl. No.: 468,451

[22] Filed: Feb. 22, 1983

[51] Int. Cl.³ ............................................. A01K 1/03
[52] U.S. Cl. ..................................................... 119/19
[58] Field of Search .............. 119/16, 23, 19; 229/22, 229/41 D

[56] References Cited

U.S. PATENT DOCUMENTS

| | | | |
|---|---|---|---|
| 1,950,111 | 3/1934 | Heim | 229/41 D |
| 2,935,238 | 5/1960 | Koehler | 229/22 |
| 3,016,042 | 1/1962 | Curn, Jr. | 119/79 |
| 3,178,092 | 4/1965 | Munana et al. | 229/22 |
| 3,256,860 | 6/1966 | Parker | 119/19 |
| 3,730,418 | 5/1973 | Spencer | 229/22 |
| 4,295,446 | 10/1981 | Voss | 119/19 |
| 4,391,223 | 7/1983 | Holland et al. | 119/19 |

FOREIGN PATENT DOCUMENTS 1395848  3/1965  France .................................. 229/22

Primary Examiner—Hugh R. Chamblee
Attorney, Agent, or Firm—Hoffmann, Dilworth, Barrese & Baron

[57] ABSTRACT

An animal house is provided which is particularly adaptable for use with cats. The house is formed of an elongated base adapted to stand substantially vertical and a platform at the upper end of the base to form an animal perch. Access is permitted to the interior of the base for the animal to enter and leave the house. It is contemplated that the house can be formed of a unitary single piece of self-supporting material and in one form include an elongated substantially vertical base tapering inwardly from bottom to top and a substantially horizontal platform on the upper end of the base forming the animal's perch. The base is hollow with a hole provided for access to the interior of the house.

17 Claims, 5 Drawing Figures

ANIMAL HOUSE

BACKGROUND OF THE INVENTION

There are many different types of animal houses that have been developed over the years for different types of animals for indoor as well as outdoor use. The most prevelant structures are those designed for common domestic animals such as dogs and cats on an individual base and for larger groups and types animals in the form of barns and stables and the like.

In most respects, these animal domiciles are designed to provide comfort for the animal predominantly during rest and sleep periods and also as protection against the elements.

Versatility is extremely desirable. For example, it is useful to provide a house for cats, which not only includes sleeping quarters for the cat but also is designed to satisfy other natural habits for the animal. For instance, scratching posts are devices that most cats enjoy the use of for sharpening claws and exercise. In fact, in the absence of a scratching post, the cat can often become a pest and cause damage by scratching on screens, walls or furniture.

Additionally, in respect to cats, they normally prefer to rest in an elevated location where they can observe what is going on around them and be in a comfortable defensive position while being able to satisfy a natural urge to pounce. Often in the home, the cat will perch on window sills, the upper edge of furniture and stairs or overhanging ledges.

Accordingly, it would be extremely advantageous to provide a house for a cat, for example, which includes interior sleeping quarters, surfaces adaptable for use as a scratching post and a platform forming a perch. The structure should be compact, unitary in nature, inexpensive in manufacture and unobtrusive in the home.

SUMMARY OF THE INVENTION

With the above background in mind, it is among the primary objectives of the present invention to provide an animal house that has functional utilitarian surfaces and structures thereon to satisfy an animal's normal desires and needs during waking and sleeping hours. In particular, the house is adaptable for use as a house for cats with access to the interior for sleeping purposes, exterior surfaces having a texture adaptable for use by the cat as a scratching post, and a platform at the upper end for use as a perch.

Thus, the objective of the present invention is to provide a house for cats with a unitary structure formed of a single piece of substantially rigid or self-supporting material and formed with an elongated base adapted to stand vertically and having a platform thereon for use as a cat perch. Additionally, access is provided to the interior of the base for enabling the cat to enter and leave a sleeping compartment therein. A texture is provided on the exterior surface of the base so that it can be used by the cat as a scratching post.

It is an objective to provide a platform on the upper end of the base of sufficient size to enable a cat to sit or lie comfortably in an elevated perch and observe his surroundings.

It is a further objective to provide a base which is wide at the bottom than the top when standing in vertical position so that it has great stability and a pleasing visual and aesthetic appearance.

It is contemplated that the base can be formed of a single piece of self-supporting material with appropriate fold lines being provided either by areas of weakening or by less rigid material at the location of the fold lines or by appropriate hinges to permit folding. In one form it is contemplated that the base can be formed of three separate panels folded into a three sided figure of triangular cross section.

A rectangularly shaped flat platform is positioned on the upper end of the three sided base to form the perch. Appropriate access opening such as a circular aperture is formed in at least one of the walls or panels of the base to permit the cat to enter and leave the house.

It is an objective to provide appropriate areas of weakening for the fold lines and to divide the base into a serial arrangement of panels separated by the fold lines and to provide a coupling flap along one free edge of the panel with appropriate tabs for engagement with receiving slots in the free edge of the panel at the other end of the serial arrangement. When the panels are folded about the fold lines the flap is folded about a fold line and directed into the receiving slots to complete erection of the base. To facilitate retention of the panels in the erected condition, appropriate fastening means supplemental to the tabs and slots can be used on the panels, such as Velcro-type fasteners or conventional substitutes therefor.

The platform includes a serial arrangement of platform panels formed by fold lines similar to those of the base. The platform is also joined to the base by means of a similar fold line. Included on the platform is a central panel which forms a perch with a substantially flat horizontal surfaces when the panels were folded about the respective fold lines on the platform and the free end of the platform is engaged with a receiving notch in the base. Appropriate fastening means such as Velcro-type fastener or conventional substitutes therefor can be used to hold the folded overlying panels together.

It is a further objective to provide a predetermined size for the platform panels so that, when the house is erected, the panel forming the perch on the platform is substantially horizontal to provide a desirable perch for the cat.

It is a further objective to provide a combination house, perch and scratching board for cats wherein a tapered design is provided for the multi sided base tapering inward from bottom to top and the platform is substantially horizontal thereby providing stability and aesthetic appearance to the animal house as well as making it attractive for the cat.

It is a further objective to provide access to the hollow interior of the base of the animal house by means of an opening in at least one of the panels of the base. The opening can be of any desired size or shape, for example, it can be a circle or a rectangular or square opening.

Still a further objective of the present invention is to provide an animal house that can be produced in any color combination, texture, pattern or design. The exterior surface can be covered with art work or photography that looks like a tree, grass, flowers, a wooden structure, rock or lava, leather, carpeting, tile , or any other material or visual effect that might be pleasing to the animal or its owner.

A still further objective of the present invention is to provide an animal house that can be constructed of individual elements interconnected by suitable fasteners or integrally from a single piece of sheet material. The material for the animal house can be chosen from any one of a number of common well-known substantially rigid, self-supporting structural materials such as wood, plywood, plastic, masonite, aluminum, pressed board, cardboard, corrugated board, foam or gator board, and the like.

It is a further objective to provide an animal house that can be constructed to any common desirable size for the particular animal and for use in the intended area whether interiorally or exteriorally of a domicile. In one form, the house is adapted for use in the home by domestic cats with a size of approximately 32 inches in height. In that form, the base is triangular in configuration, although it could also be conical, cylindrical, or any other polyagonal shape, and measures approximately 24 inches in width at the bottom when positioned vertically and approximately 12 inches at the top. The platform forming the perch is approximately 16 inches by 18 inches and is substantially rectangular. It may also of course be square or round, oval or free form.

As previously stated, the platform and base can be independently constructed and interconnected by suitable well known commercial fasteners or can be formed of a single piece of sheet material with suitable fold lines to permit erection of the base and platform into the desired final vertical configuration. Suitable semi-rigid or rigid material can be used for the construction material of sufficient strength to maintain the integrity of the structure whether in use or not in use.

The overall objective of the present invention is to provide an animal house for use by domestic animal owners, particularly cat owners, in and about the home for their pet. The house is inexpensively constructed of low cost materials and has a pleasing aesthetic appearance when completed. In one preferred form it is designed for use by cats as sleeping quarters, a scratching post, and a perch.

In summary, an animal house is provided with an elongated base adapted to stand substantially vertical and a platform on the base to form an animal perch. Access means is provided to the interior of the base to permit the animal to enter and leave the house.

The house can be formed by cutting the base and platform from a sheet of material and producing a predetermined arrangement of fold lines in the base and platform. Coupling means are formed on the base and platform so that, when the base is folded about the fold lines thereon and the platform about the fold lines thereon, the coupling means will be brought into engagement to complete erection of the animal house. With the above objectives among others in mind, reference is made to the attached drawings.

DETAILED DESCRIPTION

Figure 1:
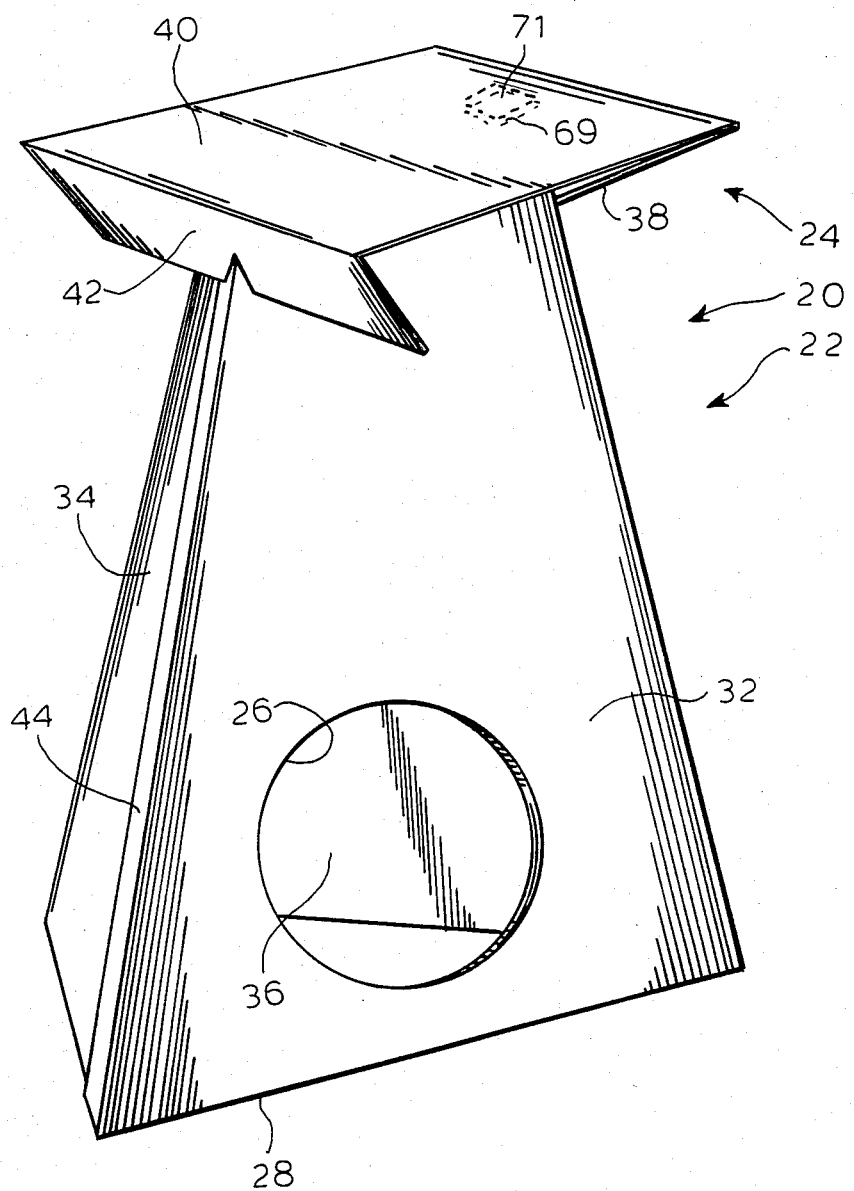
FIG. 1 is a perspective view of the animal house of the invention.

The embodiment of the invention depicted in the drawings is formed as a house for use with domestic cats other felines, and other animals with similar habits. House 20 is designed for either use within the home or outside of the home and is discussed below in regard to use for a domestic cat.

House 20 includes an elongated base 22 adapted to stand vertically and a platform 24 at the upper end of the base.

Base 22 is hollow with access to the interior being provided by means of an access hole 26 in the side wall of the base 22.

The bottom edge 28 of base 22 is wider than the upper edge 30 since the base tapers inwardly from bottom to top.

The base is three sided in configuration and has a triangular cross section. It is formed by three interengaged panels 32, 34 and 36. Alternatively, the base could be conical or multi-sided.

The platform 24 is integrally formed with the base and also includes three panels 38, 40 and 42. The central panel 40 is positioned in a relatively flat substantially horizontal position at the upper end of the base to form the engaging surface of the perch for the cat.

It is contemplated that the exposed exterior surface of panels 32, 34 and 36 of the base contain a texture either integrally formed thereon or attached thereto which is usable as a scratching surface for the cat. There are many commercially available and conventional materials that are usable for this purpose. In this way, the house provides a scratching post for the cat, sleeping quarters in the interior of the base and a perch on the upper surface of the platform 24. A cushion, made from any one or combination of a variety of commercially available materials can be attached to the top surface of the perch using Velcro fasteners or other common well known substitute fasteners, to provide additional comfort to the animal. Of course, suitable bedding can be provided on the interior of the base for use by the cat.

It is contemplated that the house 20 can be formed of separate base panels and separate platform panels interconnected by conventional fasteners. In a preferred form, as shown in the drawings, the house 20 is formed of a single piece of semi-rigid or rigid self-supporting material cut from a single sheet of material and folded about suitable lines of weakening or fold lines into the desired final configuration. In that shape, suitable coupling means is provided to hold the structure together.

Figure 2:
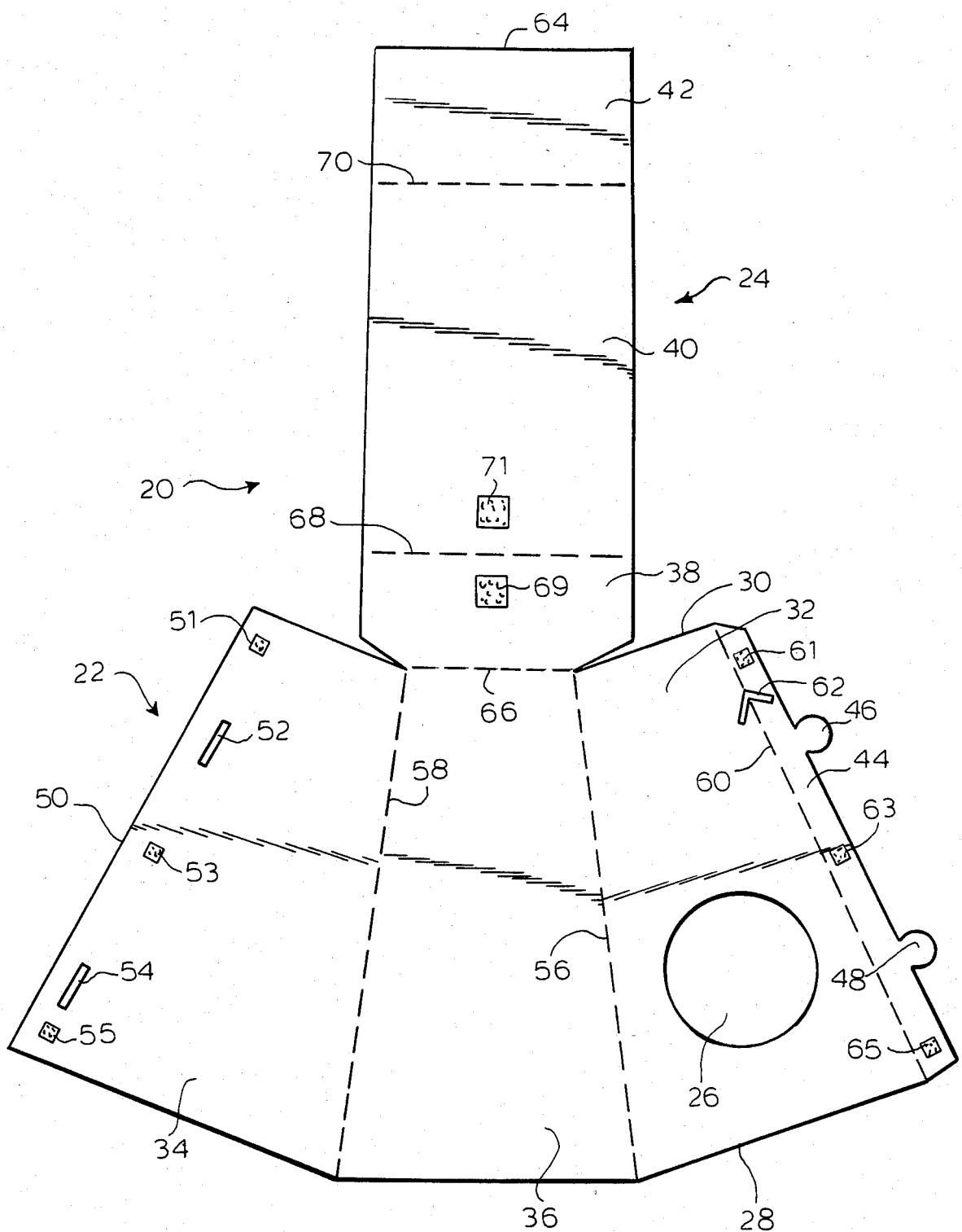
FIG. 2 is a plan view of the animal house of the invention having been cut from a sheet of material and prior to folding into the erected condition.

The pattern for the house 20 as shown in FIG. 2 is severed, die-cut, stamped out of or otherwise conventionally removed from a single sheet of material as a unitary flat piece of rigid or semi-rigid material adapted to be self-supporting. It includes the serial arrangement of base panels 32, 34 and 36 and an attached serial arrangement of platform panels 38, 40 and 42.

Additionally, integrally formed and extending from one edge of base panel 32 is a coupling flap 44 extending along the length of panel 32. Projecting from the exposed edge of coupling flap 44 is a pair of spaced tabs 46 and 48.

Adjacent the other free edge 50 of the serial arrangement of panels on base 22 is a pair of spaced slots 52 and 54 in position to mate with tabs 46 and 48 respectively when the base is folded into the erected position.

A series of three spaced Velcro fastener elements 61, 63, and 65 are positioned on flap 44 to mate with a corresponding series of three spaced Velcro fastener elements 51, 53, and 55 respectively on panel 36 adjacent free edge 50. Coupling of the Velcro fastener elements assists the noted tabs and slots in maintaining the base in erected condition. Alternatively, either the tabs and slots on the Velcro fasteners can be used alone to retain the base in erected condition.

Circular access opening 26 is formed in panel 32 adjacent the bottom edge 28 of the base.

Panels 32, 34 and 36 are adapted to be folded about suitable fold lines into a three sided hollow base of triangular cross section The folding is enabled by suitable spaced fold lines between each connected adjacent pair of panels and between panel 36 and flap 44. Thus, fold line 56 connects panels 32 and 34, fold line 58 contacts panels 34 and 36, and fold line 60 connects panel 36 with flap 44.

A further element of structure formed in base 22 before erection of the house is a V-shaped notch 62 extending across fold line 60 into panel 32 and flap 44. Notch 62 is adjacent the upper edge 30 of the base in position to engage with free end 64 of platform 24 when house 20 is erected.

Base 22 is interconnected with platform 24 about line of weakening of fold line 66 at the upper edge 30 of the base. The fold line 66 extends only between panel 34 and platform 24 with the upper edge portions of panels 32 and 36 being free from interengagement with the platform.

The three platform panels 38, 40 and 42 are separated by suitable fold lines or lines of weakening. Panel 38 is separated from panel 40 by means of fold line 68 and panel 40 is separated from panel 42 by means of fold line 70. Fold lines 68 and 70 are formed in the same manner as fold lines 56, 58 and 60 of the base. Panels 38 and 42 are substantially smaller than the intermediate or central panel 40 which forms the surface for the cat's perch. The smaller panels 38 and 42 are the connecting panels between the platform and the base.

Mating Velcro fastener elements 69 and 71 are on panels 38 and 40 respectively to engage each other and hold the panels 38 and 40 in overlying folded condition against one another when the house 20 is assembled. Use of the Velcro fastener elements is a matter of choice. Alternatively, they can be omitted or a plurality of spaced mating arrangement can be employed.

Figure 3:
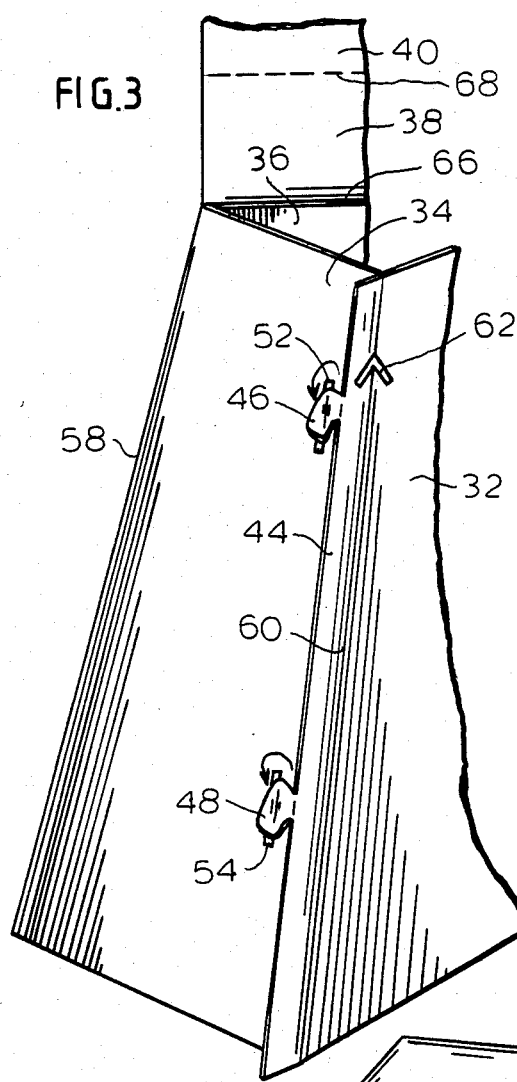
FIG. 3 is a fragmentary perspective view thereof in partially folded condition and showing the first folding step.
Figure 4:
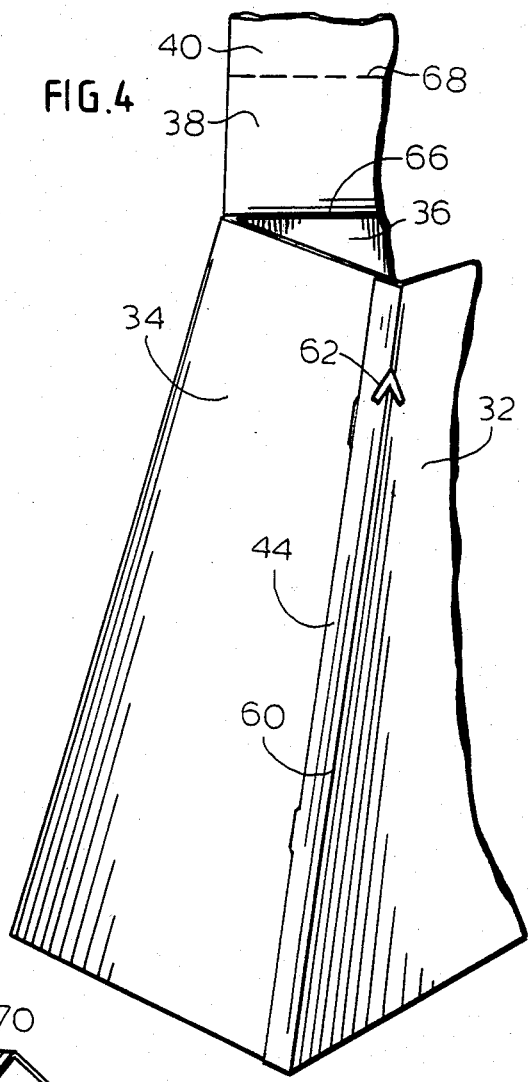
FIG. 4 is a fragmentary perspective view thereof and showing the second folding step.
Figure 5:
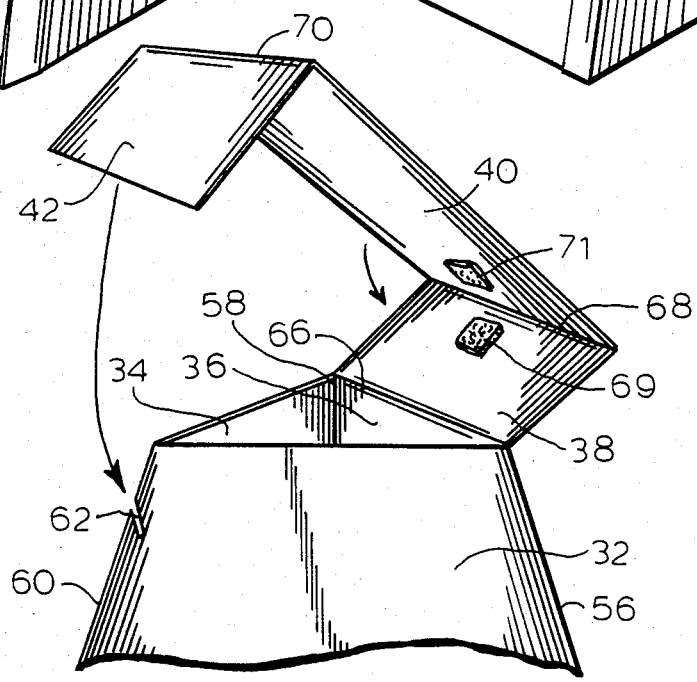
FIG. 5 is a fragmentary perspective view thereof and showing the first folding step with an arrow showing the direction of fold.

The assembly sequence is depicted in FIGS. 3–5. The first step, as shown in FIG. 3, is to fold panels 36 and 32 about fold lines 58 and 56 respectively and flap 44 about fold line 60 in order to bring tabs 46 and 48 into alignment for insertion in slots 52 and 54 respectively. The tabs and slots are dimensioned so that there will be an interference fit when the tabs are inserted into the slots in the second step thereby holding the base in erected condition adapted to stand vertically with the bottom edge 28 resting on the floor. Additionally, Velcro fastener elements 61, 63 and 65 will engage with Velcro fastener elements 51, 53 and 55 to produce an additional holding force. The resultant three sided base, as shown in FIG. 4, is triangular in cross section and the access opening 26 will permit the cat to enter the hollow interior.

In the third and final step, as shown in FIG. 5, the platform 24 is folded about fold line 66 to bring it toward the horizontal direction. Central panel 40 is folded about fold line 68 and panel 42 is folded about fold line 70 until free edge 64 becomes aligned with notch 62 in the base, as depicted by the arrow in FIG. 5. Insertion of free edge 64 into notch 62 causes frictional engagement between the surfaces of the base surrounding the notch and the surfaces adjacent free edge 64 thereby holding the platform to the base in the desired erected configuration. Suitable alternative holding means can be employed to hold free edge 64 in engagement with the base in lieu of notch 62. For example, a Velcro fastener assembly could be used instead of or as a supplement to notch 62. The central platform panel 40 will be substantially horizontal and folded into engagement with panel 38 with Velcro fastener element 71 in engagement with Velcro fastener element 69 assisting to hold the panels together. This produces a desirable aesthetic appearance for the full assembly of house 20 as shown in FIG. 1.

Naturally, house 20 can be disassembled in a similar reverse manner for storage during non-use or for transportation to a new location for reassembly and use.

Other alternative coupling means in place of tabs and slots and Velcro fasteners can be used for retaining the base and platform in erected condition, for example, suitable conventional fasteners.

The fold lines are arranged so that they angle slightly toward one another from bottom edge 20 toward top edge 30 thereby providing a slight inward taper for the base from bottom to top for aesthetic reasons and for increasing stability of the structure.

The result is a combination house, perch and scratching board for use by cats. The upper surface of platform panel 40 is large enough to hold a cat comfortably. Base 22 is slightly tapered, being wider at bottom edge 28 and narrower at top edge 30 where it is interconnected with platform 24. The tapered design adds stability and contributes to the style and appearance of house 20.

Opening 26 is preferably positioned adjacent lower edge 30 of base 22 to provide the cat with easy access to the interior quarters. Opening 26 can be any size or shape, for example a circular opening as shown.

House 20 can be produced in any color combination, texture, pattern or design. It may be covered with art work or photography that looks like a tree, grass, flowers, a wooden structure, rock or lava, leather, carpeting, tile, or any other suitable material or visual effect.

House 20 can be constructed of any number of different types of material, rigid or semi-rigid and self-supporting, such as wood, plywood, plastic, masonite, aluminum, pressed board, various types of cardboard, corrugated board, foam or gator board, or any other common type of building material of wood, plastic or metal.

House 20 can be of any desirable size. For the cat house depicted in the drawings, a preferred size is approximately 32 inches high with a triangular base approximately 24 inches wide at the bottom and 12 inches wide at the top. Alternatively, the base could be conical, cylindrical or any other common polygonal configuration which will stand erect or vertical by itself.

The platform 24 is approximately 16 by 18 and rectangular in configuration. Alternatively, it can be square, round, oval or free-form. The house is constructed in an inexpensive manner of low cost materials and is adaptable for use in most home environments. It is also portable since it is easily assembled and disassembled, constructed of few parts and is compact in nature.

Thus the several aforenoted objects and advantages are most effectively attained. Although several somewhat preferred embodiments have been disclosed and described in detail herer:n, it should be understood that

I claim:

1. A combination animal house and perch comprising; an elongated vertical base having an upper end and a lower end formed of a circumferential sidewall arrangement surrounding a hollow interior, a substantially horizontal Platform on the upper end of the base to form an animal perch when the lower end of the base engages a support surface, the sidewall arrangement tapering inwardly from the lower end to the upper end facilitates support of an animal perched on the platform, and an access opening in the sidewall arrangement to permit an animal to enter and leave the hollow interior of the sidewall arrangement thereby forming a house for the animal, the house and platform being formed of a unitary piece of material, a portion of the unitary piece of material used to form the base including three spaced fold lines to form three serially arranged panels and an attached coupling flap whereupon folding of the panels about the fold lines brings the flap into coupling engagement with a coupling receiving surface on one of the panels in order to shape the base into a three-sided configuration of triangular cross section, the portion of the unitary piece of material used to form the platform including three spaced fold lines to form a serial arrangement of three platform panels, and one of the fold lines interconnecting the base with one of the platform panels so that when the platform panels are folded about the fold lines a free edge of the platform is brought into engagement with a platform receiving surface on the base so that the platform is positioned as an animal perch.

2. The invention in accordance with claim 1 wherein the flap on the base includes at least one extending tab and the panel of the base distal from the flap contains at least one corresponding slot so that folding of the base about its fold lines and interengagement of each tab with each corresponding slot will couple the base together, and the base having a notch formed therein in alignment with the platform so that when the base is folded about its fold lines into the final configuration and the platform is folded about its fold lines to the final configuration a free edge of the platform will engage the notch retaining the platform in position relative to the base and the combination house and perch in erected condition.

3. The invention in accordance with claim 1 wherein the flap on the base and the panel of the base distal from the flap have mating Velcro fastener elements mounted thereon so that fastening of the base about its fold lines will bring the Velcro fastener elements into mating interengagement and couple the base together, and the base having a notch formed therein in alignment with the platform so that when the base is folded about its fold lines into the final configuration and the platform is folded about its fold lines into the final configuration a free edge of the platform will engage the notch retaining the platform in position relative to the base and the house in erected condition.

4. The invention in accordance with claim 1 wherein at least a portion of the sidewall arrangement as an exterior surface with a surface texture desirable for use as a scratching post by a cat.

5. The invention in accordance with claim 1 wherein the other two platform panels having mating fastener elements to retain them in overlying engaging relationship when the house is fully erected.

6. The invention in accordance with claim 5 wherein the mating fastener elements on the platform panels are Velcro fastener elements.

7. The invention in accordance with claim 5 wherein a Velcro fastener assembly is provided on the one platform panel and the base to assist in holding the free edge of the platform in engagement with the base when the house is in assembled condition.

8. A method of forming an animal house and perch including an elongated substantially vertical base having upper and lower ends and a platform on the upper end of the base to form an animal perch comprising; cutting the base and platform from a sheet of material and producing a predetermined arrangement of fold lines in the base and platform, forming coupling means in the base and platform, folding the base about the fold lines thereon so as to form a circumferential sidewall arrangement surrounding a hollow interior, folding the platform about the fold lines thereon so that it rests on the upper end of the base and forms a substantially horizontal animal perch thereon, engaging the coupling means to complete erection of the animal house and perch, and the circumferential sidewall arrangement and fold lines thereon being formed so that the erected sidewall arrangement tapers inwardly from the lower end to the upper end to facilitate support of an animal perched on the platform, and providing an opening in the sidewall arrangement to permit an animal to enter and leave the hollow interior of the sidewall arrangement thereby forming a house for the animal, integrally cutting the base and platform from a sheet of material, three spaced fold lines on the base so as to form three serially arranged panels and an attached coupling flap whereupon folding of the panels about the fold lines will bring the flap into coupling engagement with a coupling receiving surface on one of the panels and shape the base into a three sided circumferential wall of triangular cross section, the platform being formed with three spaced fold lines to form a serial arrangement of three platform panels, one of the fold lines interconnecting the base with one of the platform panels whereupon folding of the platform panels about the fold lines will bring a free edge of the platform into engagment with a platform receiving surface on the base and position the platform as an animal perch.

9. The invention in accordance with claim 8 wherein at least a portion of the exterior surface of the circumferential sidewall arrangement is provided with a texture adapted for use as a scratching surface by a cat.

10. The invention in accordance with claim 8 wherein the flap on the base and the panel of the base distal from the flap have mating Velcro fastener elements mounted thereon so that folding of the base about its fold lines will bring the Velcro fastener elements into mating interengagement and couple the base together, and the base having a notch formed therein in alignment with the platform so that when the base is folded about its fold lines into the final configuration a free edge of the platform will engage the notch retaining the platform in position relative to the base and the house in erected condition.

11. The invention in accordance with claim 8 wherein the other two platform panels have mating fastener elements to retain them in overlying engaging relationship when the house is fully erected.

12. The invention in accordance with claim 11 wherein the mating fastener elements on the platform panels are Velcro fastener elements.

13. The invention in accordance with claim 12 wherein a Velcro fastener assembly is provided on the one platform panel and the base to assist in holding the free edge of the platform in engagement with the base when the house is in assembled condition.

14. A method of forming an animal house and perch including an elongated substantially vertical base having upper and lower ends and a platform on the upper end of the base to form an animal perch comprising; cutting the base and platform from a sheet of material and producing a predetermined arrangement of fold lines in the base and platform, forming coupling means in the base and platform, folding the base about the fold lines thereon so as to form a circumferential sidewall arrangement surrounding a hollow interior, folding the platform about the fold lines thereon so that it rests on the upper end of the base and forms a substantially horizontal animal perch thereon, engaging the coupling means to complete erection of the animal house and perch, and the circumferential sidewall and fold lines thereon being formed so that the erected sidewall arrangement tapers inwardly from the lower end to the upper end to facilitate support of an animal perch on the platform, and providing an opening in the sidewall arrangement to permit an animal to enter and leave the hollow interior of the sidewall arrangement thereby forming a house for the animal, the platform has a substantially flat rectangular configuration, the flap on the base includes at least one extending tab and the panel of the base distal from the flap contains at least one corresponding slot so that folding of the base about its fold lines and interengagement of each tab with each corresponding slot will couple the base together, and the base having a notch formed therein in alignment with the platform so that when the base is folded about its fold lines into the final configuration and the platform is foled about its fold lines into the final configuration a free edge of the platform will engage the notch retaining the platform in position relative to the base and the house in erected condition.

15. A method of forming an animal house and perch including an elongated substantially vertical base having upper and lower ends and a platform on the upper end of the base to form an animal perch comprising; cutting the base and platform from a sheet of material and producing a predetermined arrangement of fold lines in the base and platform, forming coupling means in the base and platform, folding the base about the fold lines thereon so as to form a circumferential sidewall arrangement arrounding a hollow interior, folding the platform about the fold lines thereon so that it rests on the upper end of the base and forms a substantially horizontal animal perch thereon, engaging the coupling means to complete erection of the animal house and perch, and the circumferential sidewall arrangement and fold lines thereon being formed so that the erected sidewall arrangement tapers inwardly from the lower end to the upper end to facilitate support of an animal perched on the platform, and proividing an opening in the sidewall arrangement to permit an animal to enter and leave the hollow interior of the sidewall arrangement thereby forming a house for the animal, the base and platform being dimensioned so that when the house is in the erected condition, it will be approximately 32 inches high, the base will be approximately 24 inches wide at the lower end and taper slightly inwardly to a width of 12 inches at the upper end, and the platform will be approximately 16 inches wide and 18 inches long.

16. A combination animal house and perch comprising; a vertically elongated base having an upper end and a lower end and being formed of a circumferential sidewall arrangement surrounding a hollow interior, a substantially horizontal platform on the upper end of the base to form an animal perch when the lower end of the base engages a support surface, the sidewall arrangement tapering inwardly from the lower end to the upper end at a predetermined angle to provide for support of an animal perched on the platform, an access opening in the sidewall arrangement to permit an animal to enter and leave the hollow interior of the sidewall arrangement thereby forming a house for the animal, at least the sidewall arrangement being formed of a unitary piece of material, a portion of the unitary piece of material being used to form the base including a plurality of spaced fold lines to form a serial arrangement of panels coupled in order to shape the base into a multi-sided configuration, and the horizontal platform being engagable with the base to be Positioned there above and on the upper end of the base with at least a portion of the platform extending beyond the width of the upper end of the base when the base is assembled so as to form an overhanging perch above the base with the access opening of the base permitting ingress and egress of the animal and the base supporting the platform and animal perch thereon.

17. A method of forming an animal house and perch including a vertically elongated base having an upper end and a lower end and a platform on the upper end of the base to form an animal perch comprising; cutting the base from a sheet of material, cutting the platform from a sheet of material, producing a predetermined arrangement of fold lines in the base and platform, forming coupling means in the base and platform, folding the base about the fold lines thereon so as to form a circumferential sidewall arrangement surrounding a hollow interior, folding the platform about the fold lines thereon so that it rests on the upper end of the base and forms a substantially horizontal animal perch thereon, engaging the coupling means to complete erection of the animal house and perch, and the circumferential sidewall arrangement and fold lines thereon being formed so that the erected sidewall arrangement tapers inwardly from the lower end to the upper end to facilitate support of an animal perched on the platform, the platform being formed with large enough dimensions so that at least a portion thereof extends beyond the width of the upper end of the base to form an overhanging perch, and providing an opening in the sidewall arrangement to permit an animal to enter and leave the hollow interior of the sidewall arrangement thereby forming a house for the animal.

* * * * *

UNITED STATES PATENT AND TRADEMARK OFFICE
CERTIFICATE OF CORRECTION

PATENT NO. : 4,520,758

DATED : June 4, 1985

INVENTOR(S) : John A. Pfriender

It is certified that error appears in the above-identified patent and that said Letters Patent is hereby corrected as shown below:

Column 2, Line 33, before "when", delete "surfaces" and insert --surface--

Column 5, Line 12, after "section", insert --.--

Column 5, Line 16, before "panels", delete "contacts" and insert --connects--

Column 7, Line 8, before "on", delete "Platform" and insert --platform--

Column 9, Line 37, before "about", delete "foled" and insert --folded--

Column 9, Line 50, after "arrangement", delete "arrounding" and insert --surrounding--

UNITED STATES PATENT AND TRADEMARK OFFICE
CERTIFICATE OF CORRECTION

PATENT NO. : 4,520,758

DATED : June 4, 1985

INVENTOR(S) : John A. Pfriender

It is certified that error appears in the above-identified patent and that said Letters Patent is hereby corrected as shown below:

```
Column 9, Line 59, after "and", delete "proividing"
 and insert --providing--

Column 10, Line 28, after "be", delete "Positioned"
 and insert --positioned--
```

Signed and Sealed this

Twenty-fourth Day of September 1985

[SEAL]

Attest:

DONALD J. QUIGG

Attesting Officer

Commissioner of Patents and Trademarks—Designate